(12) United States Patent
Lai

(10) Patent No.: US 11,246,030 B2
(45) Date of Patent: Feb. 8, 2022

(54) CONTROL METHOD FOR CONTROLLING WIRELESS DEVICE BY MEANS OF SERVICE SET IDENTIFIER

(71) Applicant: InnoCare Optoelectronics Corporation, Tainan (TW)

(72) Inventor: Chun-Fu Lai, Miao-Li County (TW)

(73) Assignee: InnoCare Optoelectronics Corporation, Tainan (TW)

( * ) Notice: Subject to any disclaimer, the term of this patent is extended or adjusted under 35 U.S.C. 154(b) by 252 days.

(21) Appl. No.: 16/412,403

(22) Filed: May 14, 2019

(65) Prior Publication Data
US 2019/0373467 A1 Dec. 5, 2019

(30) Foreign Application Priority Data

May 31, 2018 (CN) .......................... 201810552434.0

(51) Int. Cl.
*H04W 12/06* (2021.01)
*H04W 76/14* (2018.01)
*H04W 4/80* (2018.01)
*H04W 76/11* (2018.01)
*G06K 7/14* (2006.01)

(52) U.S. Cl.
CPC ............. *H04W 12/06* (2013.01); *H04W 4/80* (2018.02); *H04W 76/11* (2018.02); *H04W 76/14* (2018.02); *G06K 7/1417* (2013.01)

(58) Field of Classification Search
CPC ....... H04W 12/06; H04W 76/14; H04W 4/80; H04W 76/11; H04W 12/40; H04W 48/08; H04W 12/37; H04W 88/08; H04W 84/12; H04W 48/16; H04W 76/15; H04W 12/73; G06K 7/1417; H04L 67/141

See application file for complete search history.

(56) References Cited

U.S. PATENT DOCUMENTS

| | | | |
|---|---|---|---|
| 7,505,443 B2 * | 3/2009 | McNew ................ | H04W 48/12 370/338 |
| 7,570,969 B2 * | 8/2009 | Hwang ................. | H04W 52/24 370/338 |
| 8,411,662 B1 * | 4/2013 | Saund ................... | H04W 76/14 370/345 |
| 2004/0053601 A1 * | 3/2004 | Frank ..................... | H04L 63/18 455/411 |
| 2004/0253969 A1 * | 12/2004 | Nguyen ................ | H04W 76/11 455/515 |
| 2005/0286456 A1 | 12/2005 | McNew | |
| 2007/0171910 A1 | 7/2007 | Kumar | |

(Continued)

FOREIGN PATENT DOCUMENTS

| | | |
|---|---|---|
| TW | 201509210 A | 3/2015 |
| TW | 201639405 A | 11/2016 |

*Primary Examiner* — Joseph P Hirl
*Assistant Examiner* — Thomas A Gyorfi
(74) *Attorney, Agent, or Firm* — JCIPRNET

(57) ABSTRACT

A control method for controlling a wireless device includes setting a decode protocol at a first wireless device and a second wireless device; publishing a service set identifier (SSID) by the first wireless device; detecting the service set identifier by the second wireless device; decoding the service set identifier according to the decode protocol by the second wireless device; and executing a specific function according to the service set identifier by the second wireless device.

15 Claims, 6 Drawing Sheets

(56) References Cited

U.S. PATENT DOCUMENTS

| | | | |
|---|---|---|---|
| 2014/0369271 A1 | 12/2014 | Amini | |
| 2015/0190208 A1* | 7/2015 | Silveira | A61B 5/14551 600/301 |
| 2017/0055315 A1* | 2/2017 | Lin | H04W 84/12 |
| 2019/0200845 A1* | 7/2019 | Levy | A61B 1/042 |

* cited by examiner

CONTROL METHOD FOR CONTROLLING WIRELESS DEVICE BY MEANS OF SERVICE SET IDENTIFIER

BACKGROUND OF THE DISCLOSURE

1. Field of the Disclosure

The disclosure relates to a control method for controlling a wireless device, and more particularly, a control method used for generating a network link or executing a specific function by the wireless device after the wireless device decodes a service set identifier.

2. Description of the Prior Art

When using a general wireless device, problems of network link or settings happen regularly. Generally, setting values are inputted through a usable interface such as a wired network interface, a near field communication (NFC) interface or a two-dimensional barcode photographed by a camera. When using a wireless network interface, a common method is to set a wireless device to an access point (AP) mode for the wireless device to receive a setting value from an external source.

In an environment without a wired network, a wireless interface is required for a wireless device to receive a setting value from an external source. A common method is to preset the wireless device to an AP mode and install another hardware component (e.g. a button) on the wireless device. However, a wireless device may not have the hardware component. It will increase equipment cost and operation complexity after installing the hardware component. The present disclosure may provide a control method for generating a network link and executing a specific function by a wireless device without installing an external hardware component.

SUMMARY OF THE DISCLOSURE

An embodiment provides a control method for controlling a wireless device. The control method includes setting a decode protocol at a first wireless device and a second wireless device; publishing a service set identifier (SSID) by the first wireless device; detecting the service set identifier by the second wireless device; decoding the service set identifier according to the decode protocol by the second wireless device; and executing a specific function according to the service set identifier by the second wireless device.

These and other objectives of the present disclosure will no doubt become obvious to those of ordinary skill in the art after reading the following detailed description of the embodiment that is illustrated in the various figures and drawings.

DETAILED DESCRIPTION

Figure 1:
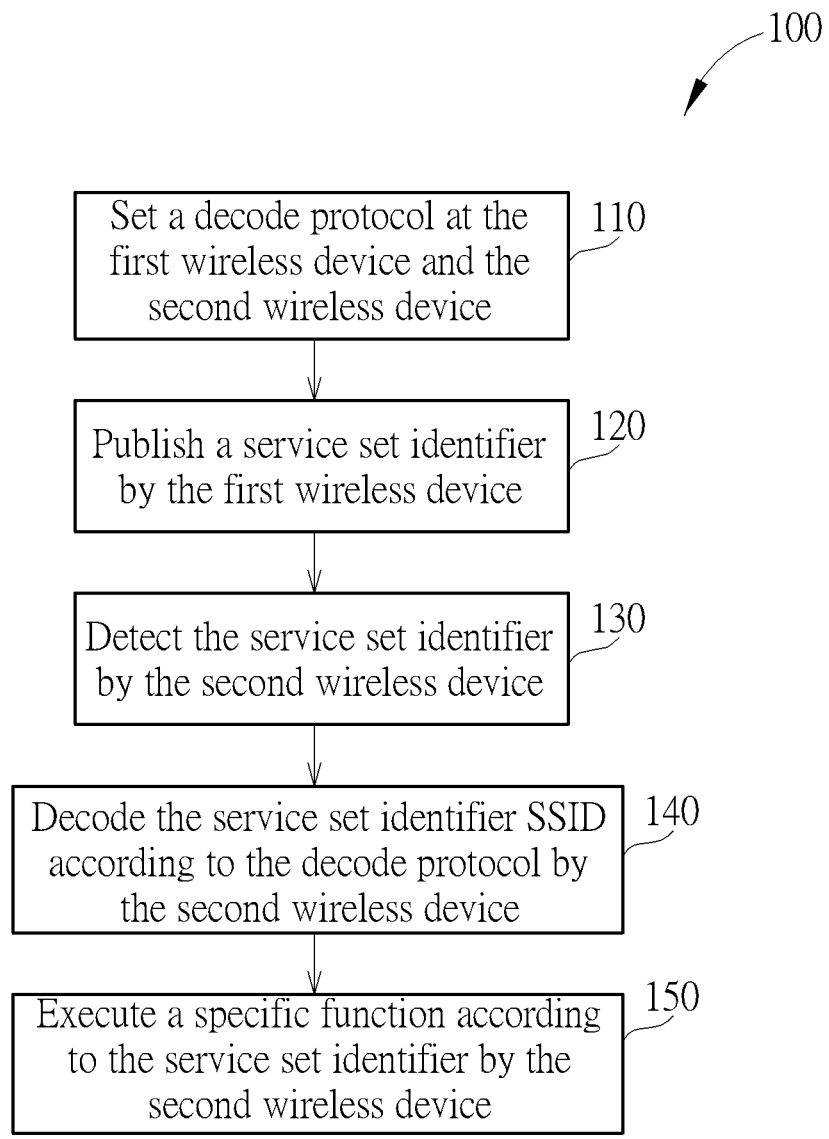
FIG. 1 illustrates a control method for controlling a wireless device according to an embodiment.
Figure 2:
FIG. 2 illustrates a format of a service set identifier described in FIG. 1 according to an embodiment.
Figure 3:
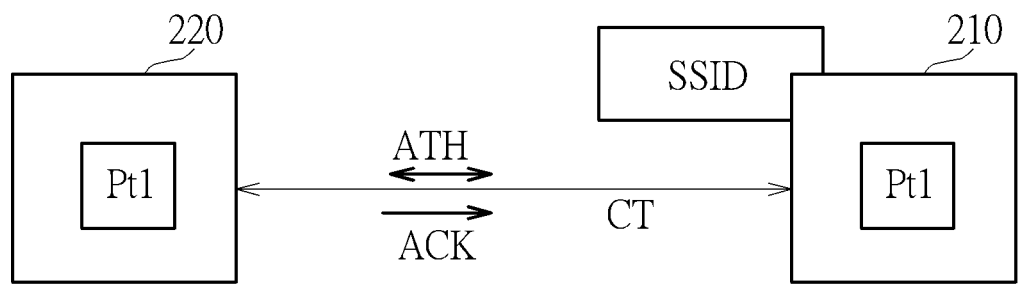
FIG. 3 illustrates that the control method of FIG. 1 is performed according to an embodiment.
Figure 4:
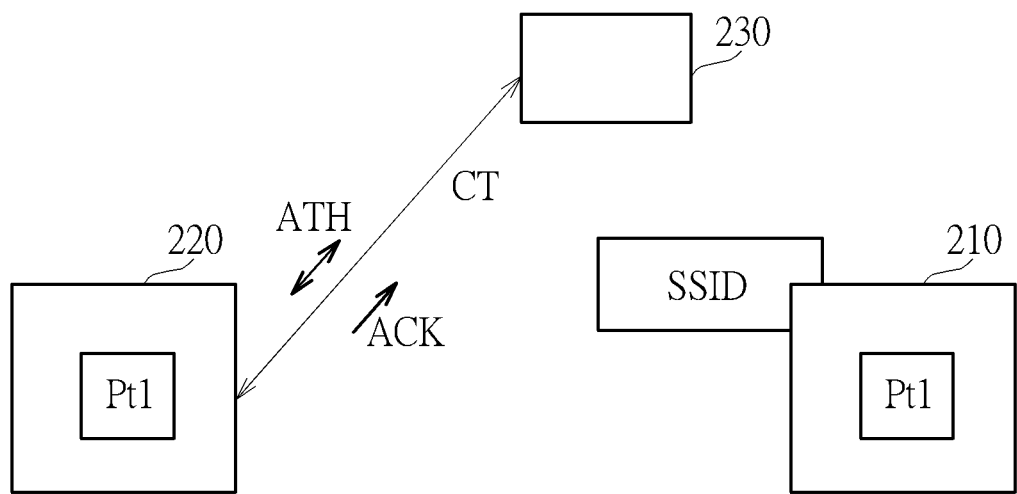
FIG. 4 illustrates that the control method of FIG. 1 is performed according to another embodiment.
Figure 5:
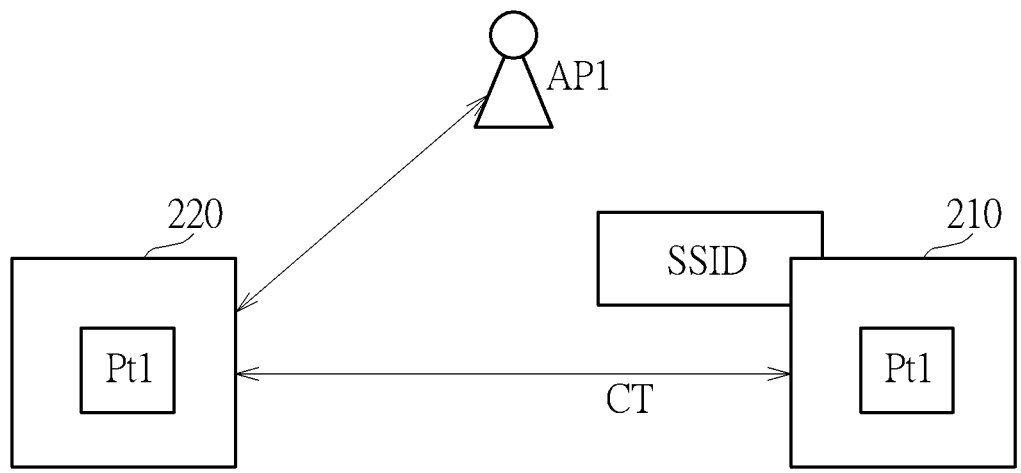
FIG. 5 illustrates that the control method of FIG. 1 is performed where the specific function is linking the second wireless device to an access point according to another embodiment.

FIG. 1 illustrates a control method 100 for controlling a wireless device according to an embodiment. FIG. 2 illustrates a format of a service set identifier SSID described in FIG. 1 according to an embodiment. FIG. 3 to FIG. 5 illustrate that the control method 100 of FIG. 1 may be performed according to embodiments. The service set identifier (SSID) mentioned below and in the figures may be a service set identifier of a wireless device. According to some embodiments, the service set identifier SSID may include (but not limited to) an extended service set identifier (ESSID). According to embodiments, a first wireless device 210 described below may include (but not limited to) a smart phone, a smart tablet, a personal computer, a specific application computer, a server, a database and/or at least one device having a wireless communication capability. According to embodiments, a second wireless device 220 described below may be used in various fields such as (but not limited to) a medical field, an office, a campus, a communication application, an optical detection application, etc. According to embodiments, the second wireless device 220 may include (but not limited to) a medical wireless device such as an X-ray detection board, an X-ray camera, a magnetic resonance imaging (MRI) device, a computed tomography device, a positron emission camera and/or another medical device with a wireless communication capability.

As shown in FIG. 1, FIG. 3 and FIG. 5, the control method 100 for controlling the second wireless 220 device may include following steps.

Step 110: seta decode protocol Pt1 at the first wireless device 210 and the second wireless device 220;

Step 120: publish a service set identifier SSID by the first wireless device 210;

Step 130: detect the service set identifier SSID by the second wireless device 220;

Step 140: decode the service set identifier SSID according to the decode protocol Pt1 by the second wireless device 220; and Step 150: execute a specific function according to the service set identifier SSID by the second wireless device 220.

According to an embodiment, the decode protocol Pt1 in Step 110 may be a set of syntax or a decode table, but the disclosure is not limited thereto. According to an embodiment, the second wireless device 220 may, for example, turn on a scan mode (i.e. a detection mode) to detect or scan all service set identifiers published within a range of a distance. These detected service set identifiers may be, for example, public service set identifiers. According to an embodiment, the second wireless device 220 may interpret the service set identifier SSID published by the first wireless device 210 by decoding or parsing the service set identifier SSID, and the disclosure is not limited thereto.

According to an embodiment, the first wireless device 210 in Step 120 may, for example, publish at least one service set identifier SSID. At the time, within a range of a suitable distance, another wireless device set to a scan (detection) mode may detect the service set identifier SSID published by the first wireless device 210. In Step 130, the second wireless device 220 may, for example, detect the service set identifier SSID published by the first wireless device 210 by scanning, and the disclosure is not limited thereto.

The abovementioned service set identifier may not be used merely as a name, where the name is mainly used for another wireless device to recognize and identify the first wireless device 210. According to an embodiment, the service set identifier SSID published by the first wireless device 210 may include various sorts of information such as assignment information, notification information (including password information and/or network link information) and/or enabling execution information, but the disclosure is not limited thereto. The enabling execution information may, for example, be used to inform the second wireless device 220 to turn on a function of a component such as turn on or turn off a mode through the component, and this will be described below.

According to an embodiment, the service set identifier (SSID) may, for example, include one or more character and be 32 bytes. According to another embodiment, the service set identifier SSID may, for example, include one or more character and be shorter than 32 bytes. As shown in FIG. 2, the service set identifier SSID may include at least one of a prefix field P1, a check code field P2, a command field P3 and a serial number field P4, and/or another sort of field, but the disclosure is not limited thereto. The sorts and sequence of fields shown in FIG. 2 may merely be an example, and the scope of embodiments is not limited by FIG. 2. According to another embodiment, the sequence of the fields may be changed, and one of the fields may be omitted. According to another embodiment, another information field may be added to the service set identifier SSID. In FIG. 2, the length of each field and the number of characters of the field are not related, and the lengths of the fields are not used to limit the scope of embodiments.

According to an embodiment, when the service set identifier SSID includes the prefix field P1, in Step 140 the second wireless device 220 may determine whether to further decode the service set identifier SSID according to the characters of the prefix field P1, but the disclosure is not limited thereto. For example, if the second wireless device 220 determines that the characters of the prefix field P1 fails to comply with the rules of the decode protocol, the second wireless device 220 may stop decoding or processing the service set identifier SSID. If the second wireless device 220 determines that the characters of the prefix field P1 complies with the rules of the decode protocol, the second wireless device 220 may decode or process the service set identifier SSID, but the disclosure is not limited thereto.

According to an embodiment, when the service set identifier SSID includes the check code field P2, the second wireless device 220 may determine whether the result of decoding the service set identifier SSID is correct according to the characters of the check code field P2. For example, a specific algorithm or another method may be used to obtain the result of decoding, and the second wireless device 220 may determine the correctness of the result of decoding according to the result of decoding. If a value obtained according to the result of decoding fails to correspond or be equal to the check code field P2, the result of decoding may be determined to be incorrect at the time. If a value obtained according to the result of decoding can correspond or be equal to the check code field P2, it may be allowed to further perform decode operation on the service set identifier SSID, but the disclosure is not limited thereto.

According to an embodiment, when the service set identifier SSID includes the command field P3, the characters of the command field P3 may correspond to the specific function executed by the second wireless device 220. According to an embodiment, for example, the second wireless device 220 may execute the specific function according to the command field P3 after decoding the service set identifier SSID, but the disclosure is not limited thereto. For example, if the abovementioned specific function is linking the second wireless device 220 to a specific access point (AP), the command field P3 may record a network address of the specific access point and/or a password of the specific access point, but the disclosure is not limited thereto. According to some embodiments, the second wireless device 220 (e.g. an enabling component of the second wireless device 220) may execute the specific function according to the content of the command field P3. For example, when the second wireless device 220 is an X-ray detection device, the X-ray detection device may operate according to an enabling command of the command field P3. For example, the enabling command of the command field P3 may be turning on an automatic exposure detection (AED) function, and a component for controlling the automatic exposure detection function may execute the function according to the enabling command at the time, but the disclosure is not limited thereto. In the abovementioned condition, the command field P3 may describe the enabling command and/or a code of the component used to execute the enabling function, but the disclosure is not limited thereto.

When the service set identifier SSID includes the serial number field P4, for example, in Step 140 the second wireless device 220 may determine whether the second wireless device 220 corresponds to the service set identifier SSID according to the serial number field P4. For example, when there are ten medical devices, and merely the third medical device is supposed to be controlled, the third medical device may be indicated in the serial number field P4. In this condition, the third medical device may be the abovementioned second wireless device 220. According to some embodiments, for example, the serial number field P4 may include a serial number and/or a model code of a device for the convenience of comparison, the disclosure is not limited thereto. According to some embodiments, the serial number may include a phone number or an identity related number. According to some embodiments, it may be checked whether a controlled device is a correct device according to the serial number field P4.

After decoding the service set identifier SSID by the second wireless device 220, the second wireless device 220 may obtain or receive functional information sent by the first wireless device 210, and execute a specific function according to the functional information.

According to some embodiments, the specific function may include generating a network link CT used to link the second wireless device 220 to the first wireless device 210. According to some embodiments, the specific function may include linking the second wireless device 220 to a wireless access point (AP).

FIG. 3 illustrates that the control method 100 of FIG. 1 is performed according to an embodiment. As shown in FIG. 3, the network link CT may be generated between the second wireless device 220 and the first wireless device 210, but the disclosure is not limited thereto. After the network link CT is generated between the second wireless device 220 and the first wireless device 210, for example, the first wireless device 210 may publish the service set identifier SSID to order or designate the second wireless device 220 to execute the specific function. For example, the specific function may be assigned by the first wireless device 210. According to some embodiments, the first wireless device 210 may order or designate the second wireless device 220 to turn on or turn off a specific function. For example, when the second wireless device 220 is a medical camera, the first wireless device 210 may order or inform the second wireless device 220 to start photographing (i.e. turn on a function) or stop photographing (i.e. turnoff the function), but the disclosure is not limited thereto. When the second wireless device 220 is an X-ray detector, the first wireless device 210 may order or inform the second wireless device to enable an automatic exposure detection (AED) mode (i.e. turn on a function) or disable the automatic exposure detection mode (i.e. turn off the function), but the disclosure is not limited thereto. When the second wireless device 220 is an X-ray detector, for example, the second wireless device 220 may include an active pixel sensor (APS), a passive pixel sensor (PPS), and/or another sort of sensor.

FIG. 4 illustrates that the control method 100 of FIG. 1 is performed according to another embodiment. As shown in FIG. 4, the network link CT may be generated between the second wireless device 220 and a server 230. For example, the server 230 may be linked to the first wireless device 210 by wire or wirelessly. According to some embodiments, the server 230 may be independent from the first wireless device 210.

A shown in FIG. 3 or FIG. 4, for example, the second wireless device 220 may obtain functional information through the network link CT, and the second wireless device 220 may execute a specific function according to the functional information. For example, when the length of the service set identifier SSID is insufficient to record the functional information, the network link CT may be first generated, then the functional information may be sent to the second wireless device 220 through the network link CT, and the second wireless device 220 to execute the specific function. For example, the functional information may be sent to the second wireless device 220 as a packet, but the disclosure is not limited thereto. According to some embodiments, for example, the first wireless device 210 may send the functional information to a network address, and order the second wireless device 220 to obtain the functional information from the network address. According to some embodiments, the functional information may include a network address and/or a password of a specific access point for the second wireless device 220 to link to the specific access point, but the disclosure is not limited thereto. According to some embodiments, for example, the functional information may include information used to control the second wireless device 220 to execute the specific function, but the disclosure is not limited thereto.

According to the embodiment of FIG. 5, the specific function executed by the second wireless device 220 may include linking the second wireless device 220 to a wireless access point AP1. For example, the second wireless device 220 may receive the functional information by decoding the service set identifier SSID or through the network link CT, and then the second wireless device 220 may be informed to link to the wireless access point AP1 by the functional information, where the functional information may include an address and/or a password of the wireless access point AP1, but the disclosure is not limited thereto. Then, for example, the second wireless device 220 may be linked to the wireless access point AP1 via a wireless path, but the disclosure is not limited thereto.

According to the embodiment of FIG. 5, for example, when the second wireless device 220 is an X-ray detector, if the second wireless device 220 is moved to another laboratory, a user (such as, but not limited to, a doctor or a medical worker) may use the first wireless device 210 (such as, but not limited to, a smart phone or a tablet) to assign the second wireless device 220 to link to a network router (that is the wireless access point AP1) of the another laboratory. In this condition, for example, the second wireless device 220 may turn on a scanning mode or a detection mode to detect the service set identifier SSID published by the first wireless device 210, then receive or obtain the functional information, and then be linked to the wireless access point AP1 according to the functional information, but the disclosure is not limited thereto. In the abovementioned example, it may be unnecessary for the second wireless device 220 to enter an access point mode (AP mode) or to be installed with an external hardware or software button. For a user (such as a doctor or a medical worker) to conveniently use the first wireless device 210 to assign the second wireless device 220 to execute a specific function, a corresponding application program (i.e. app) may be installed at the first wireless device 210 and the second wireless device 220 according to an embodiment, but the disclosure is not limited thereto.

According to some embodiments, after the network link CT is generated, the second wireless device 220 may perform an authentication operation (such as an encrypted authentication operation). According to the embodiment of FIG. 3, the second wireless device 220 may perform an authentication operation ATH with the first wireless device 210 through the network link CT, and the first wireless device 210 may confirm the correctness of the second wireless device 220 by means of the authentication operation ATH. The probability of another wireless device being linked may hence be reduced, and the information security may be improved. According to the embodiment of FIG. 4, the second wireless device 220 may perform the authentication operation ATH with the server 230 through the network link CT, the server 230 may confirm the correctness of the second wireless device 220, but the disclosure is not limited thereto. The authentication operation ATH may, for example, be optionally performed as a non-essential step.

According to some embodiments, for example, after performing Step 150, the second wireless device 220 may send an acknowledgement ACK through the network link CT. According to the embodiment of FIG. 3, the second wireless device 220 may send the acknowledgement ACK to the first wireless device 210 through the network link CT. According to the embodiment of FIG. 4, the acknowledgement ACK may be sent to the server 230 through the network link CT. The step of sending the acknowledgement ACK may be optionally performed and be a non-essential step.

Figure 6:
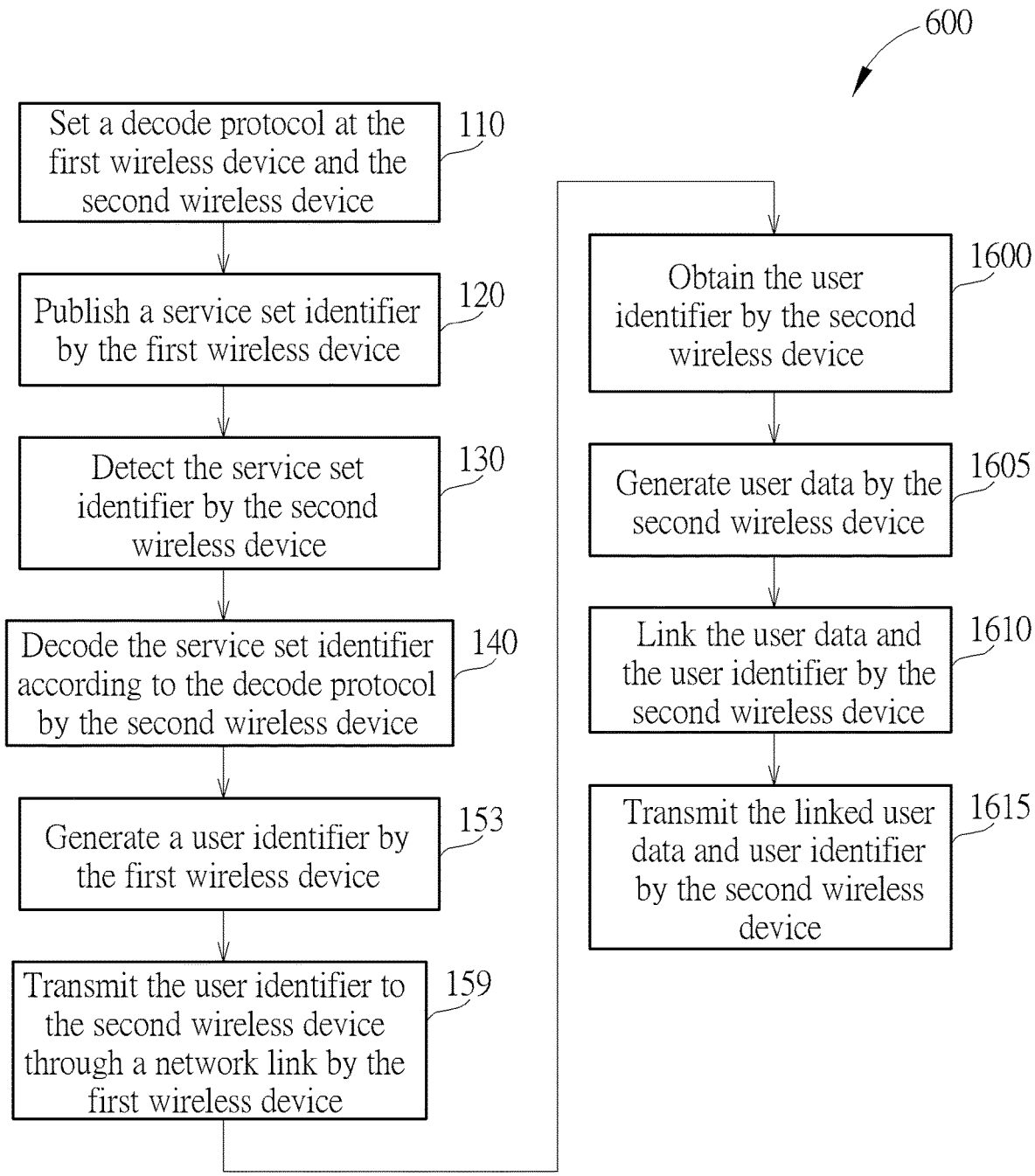
FIG. 6 illustrates a flowchart of a control method according to another embodiment.

FIG. 6 illustrates a possible flowchart of a control method 600 according to another embodiment. For example, the control method 600 may include the following steps.

Step 110: set a decode protocol Pt1 at the first wireless device 210 and the second wireless device 220;

Step 120: publish a service set identifier SSID by the first wireless device 210;

Step 130: detect the service set identifier SSID by the second wireless device 220;

Step 140: decode the service set identifier SSID according to the decode protocol Pt1 by the second wireless device 220;

Step 153: generate a user identifier UID by the first wireless device 210;

Step 159: transmit the user identifier UID to the second wireless device 220 through a network link by the first wireless device;

Step 1600: obtain the user identifier UID by the second wireless device 220;

Step 1605: generate user data UD by the second wireless device 220;

Step 1610: link the user data UD and the user identifier UID by the second wireless device 220; and Step 1615: transmit the linked user data UD and user identifier UID by the second wireless device 220.

In above, Step 110 to Step 140 may be similar to that of the embodiment of FIG. 1, so the steps are not repeatedly described. Step 1600 to 1616 may be included by Step 150.

According to some embodiments, Step 159 may include the first wireless device 210 directly transmits the user identifier UID to the second wireless device 220 through a network link. In another case, Step 159 may include the first wireless device 210 provides a network address to the second wireless device 220 through a network link, and the second wireless device 220 obtains the user identifier UID from the network address. The disclosure is not limited thereto.

Figure 7:
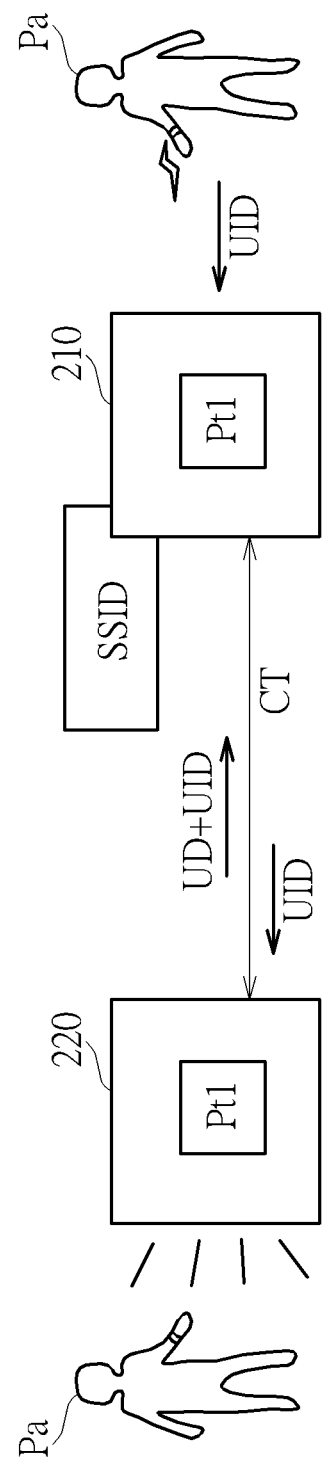
FIG. 7 illustrates that the control method of FIG. 1 is performed according to another embodiment.

FIG. 7 illustrates that the control method 100 of FIG. 1 is performed according to another embodiment. According to some embodiments, for example, the second wireless device 220 may be a medical data detection device, and the user data UD may be medical user data, but the disclosure is not limited thereto. According to some embodiments, for example, the first wireless device 210 may be a personal computer, the second wireless device 220 may be an X-ray detector having a wireless interface, the user data UD may be an X-ray radiograph of a user (such as a chest X-ray radiograph, an abdominal X-ray radiograph or an X-ray radiograph of another body part), but the disclosure is not limited thereto.

Regarding Step 153, for example, the first wireless device 210 may generate the user identifier UID of a patient Pa by scanning a two-dimensional barcode of a medical record document, scanning a barcode of an identity document, sensing an identity card of the patient Pa through a radio-frequency (RF) path, or sensing a wristband of the patient Pa through a near field communication (NFC) path, but the disclosure is not limited thereto. For example, the user identifier UID may be a number or a code corresponding to the patient Pa. An X-ray detector (i.e. the second wireless device 220) may then receive the user identifier UID through a network link, and link the user data (e.g. an X-ray radiograph) with the user identifier UID, but the disclosure is not limited thereto.

Regarding Step 159, for example, the first wireless device 210 may transmit the user identifier UID to the second wireless device 220, and the second wireless device 220 may receive the user identifier UID of the patient Pa. When Step 159 is being performed, or after Step 159 has been performed, for example, the patient Pa may move close to the second wireless device 220, or the second wireless device 220 may be moved close to the patient Pa. For example, in Step 1605, the second wireless device 220 may be used to take an X-ray radiograph of the patient Pa (such as a chest X-ray radiograph, an abdominal X-ray radiograph or an X-ray radiograph of another body part), but the disclosure is not limited thereto.

Regarding Step 1610, for example, the second wireless device 220 may link the user data UD and the user identifier UID to be one piece of data. By means of this step, a taken X-ray radiograph and a patient number may be fast matched, and the probability of mismatching the user data UD and the user identifier UID may be reduced. Regarding Step 1615, the linked user data UD and user identifier UID such as the X-ray radiograph and/or the number of the patient Pa respectively may be sent to a predetermined destination, but the disclosure is not limited thereto.

According to the embodiment of FIG. 7, the X-ray radiograph and/or the number of the patient Pa may be transmitted to the first wireless device 210 through the network link CT, but the disclosure is not limited thereto. Afterward, for example, the first wireless device 210 may store the linked user data UD and/or user identifier UID, or transfer the linked data to another device such as a cloud storage platform or a cloud server, but the disclosure is not limited thereto.

Figure 8:
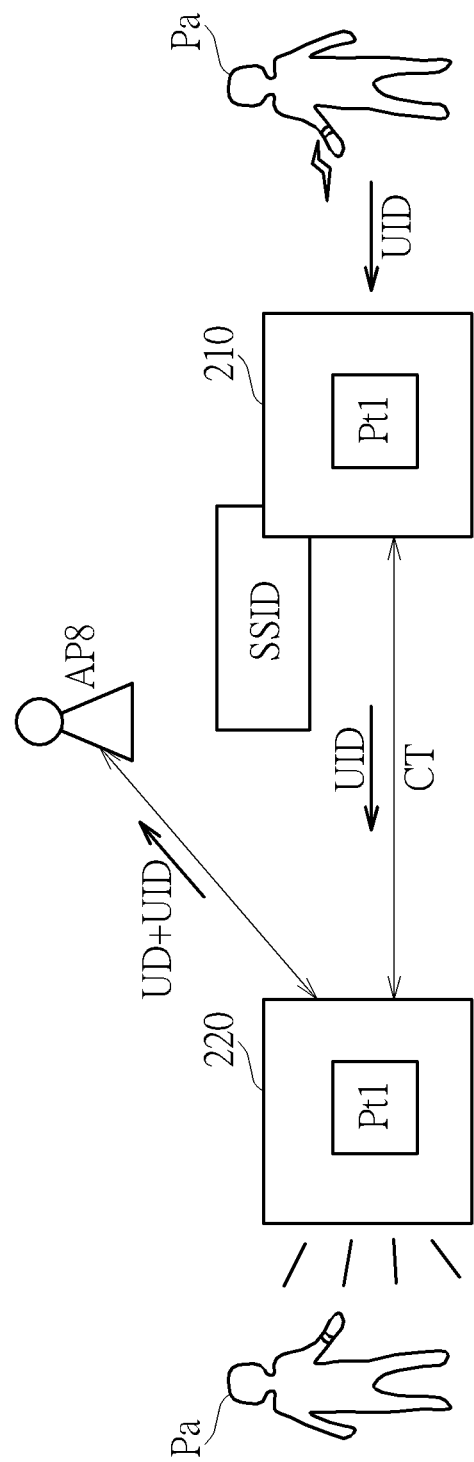
FIG. 8 illustrates that performing the control method is performed of FIG. 6 according to another embodiment.

FIG. 8 illustrates that the control method 600 of FIG. 6 is performed according to another embodiment. As shown in FIG. 8, for example, regarding Step 1615, the second wireless device 220 may transmit the linked user data UD and user identifier UID (such as an X-ray radiophoto and a number of the patient Pa) to a wireless access point AP8, where a network link between the second wireless device 220 and the wireless access point AP8 may be generated according to a result of decoding the service set identifier SSID, but the disclosure is not limited thereto.

The second wireless device 220 in FIG. 7 and FIG. 8 may be an X-ray detector as an example, but the disclosure is not limited thereto. According to another embodiment, the second wireless device 220 may be another device capable of being linked wirelessly.

As described above, for example, by means of a control method provided by an embodiment, the second wireless device 220 may not use a second interface such as an external universal serial bus (USB) interface, a near field communication (NFC) interface, a wired network interface (such as an Ethernet interface), an infrared data association (IrDA) interface and/or a camera, but the disclosure is not limited thereto. According to some embodiments, for example, it may be unnecessary to switch the second wireless device 220 to an access point (AP) mode or a virtual AP mode. Hence, it may be unnecessary to add an external hardware component (such as, but not limited to, a button). According to an embodiment, the second wireless device 220 may generate a network link and/or execute a specific function assigned by a user, but the disclosure is not limited thereto. Furthermore, a solution provided by an embodiment may be practiced by means of a service set identifier SSID without over-modifying the configuration of the network infrastructure, adding other hardware devices or increasing operational complexity. The information security may also be protected.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A control method for controlling a wireless device, comprising:
   setting a decode protocol at a first wireless device and a second wireless device;
   publishing a service set identifier by the first wireless device;

detecting the service set identifier by the second wireless device;
decoding the service set identifier according to the decode protocol by the second wireless device;
executing a specific function according to the service set identifier by the second wireless device;
generating a user identifier by the first wireless device;
transmitting the user identifier to the second wireless device through a network link by the first wireless device; and
obtaining the user identifier and executing the specific function by the second wireless device;
wherein the specific function comprises generating user data, linking the user data and the user identifier, and transmitting the linked user data and the user identifier to the first wireless device, and the second wireless device comprises a medical wireless device, an X-ray detection board, an X-ray camera, a magnetic resonance imaging (MRI) device, a computed tomography device and/or a positron emission camera.

2. The control method of claim 1, wherein the service set identifier is decoded to obtain functional information by the second wireless device, and the specific function is executed according to the functional information by the second wireless device.

3. The control method of claim 1, wherein the second wireless device executing the specific function comprises linking the second wireless device to a wireless access point.

4. The control method of claim 1, further comprising:
obtaining functional information through the network link by the second wireless device; and
executing the specific function according to the functional information by the second wireless device.

5. The control method of claim 4, wherein the network link is between the second wireless device and a server.

6. The control method of claim 4, wherein the specific function is assigned by the first wireless device.

7. The control method of claim 4, further comprising:
sending an acknowledgement through the network link by the second wireless device.

8. The control method of claim 1, wherein the user identifier is a number or a code corresponding to a user.

9. The control method of claim 1, wherein the first wireless device generates the user identifier by scanning a two-dimensional barcode of a medical record document, scanning a barcode of an identity document, sensing an identity card of the patient through a radio-frequency path, or sensing a wristband of the patient through a near field communication path.

10. The control method of claim 1, wherein the service set identifier comprises a command field, and the command field is corresponding to the specific function.

11. The control method of claim 1, wherein the service set identifier is 32 bytes.

12. The control method of claim 1, wherein the service set identifier is shorter than 32 bytes.

13. The control method of claim 1, wherein the decode protocol is a set of syntax or a decode table.

14. The control method of claim 1, further comprising:
performing an authentication operation with the first wireless device through the network link by the second wireless device; and
confirming correctness of the second wireless device by means of the authentication operation by the first wireless device.

15. The control method of claim 1, further comprising:
performing an authentication operation with a server through the network link by the second wireless device; and
confirming correctness of the second wireless device by means of the authentication operation by the server.

* * * * *